United States Patent [19]

Roy

[11] Patent Number: 5,236,168

[45] Date of Patent: Aug. 17, 1993

[54] SELF-FASTENING HANGER

[75] Inventor: Armand E. Roy, Attleboro, Mass.

[73] Assignee: Craft, Inc., South Attleboro, Mass.

[21] Appl. No.: 830,178

[22] Filed: Jan. 31, 1992

[51] Int. Cl.⁵ .......................................... F16M 13/00
[52] U.S. Cl. .................................. 248/546; 248/498;
248/684
[58] Field of Search ..................... 248/475.1, 498, 546,
248/684, 497

[56] References Cited

U.S. PATENT DOCUMENTS

| 814,163 | 3/1906 | Pursell | 248/498 |
|---|---|---|---|
| 1,223,802 | 4/1917 | Kuhn | 248/498 |
| 1,248,131 | 11/1917 | Kaplan | 248/498 |
| 1,914,951 | 6/1933 | Kiessling | 248/498 |
| 2,099,332 | 11/1937 | Di Nuccio | 248/498 |

FOREIGN PATENT DOCUMENTS

| 366178 | 5/1922 | Fed. Rep. of Germany | 248/498 |
|---|---|---|---|
| 572667 | 3/1933 | Fed. Rep. of Germany | 248/684 |
| 13067 | of 1895 | United Kingdom | 248/546 |
| 24986 | of 1908 | United Kingdom | 248/546 |

Primary Examiner—David L. Talbott
Attorney, Agent, or Firm—Salter, Michaelson & Benson

[57] ABSTRACT

A self-fastening hanger for attaching a picture-frame wire to the rear of a wooden picture frame. The hanger includes a substantially planar body portion, a ring portion which extends outwardly from one end of the body portion, and a pair of prongs which project outwardly in spaced relation from the body portion. The prongs are formed in a spiral configuration, wherein they spiral in opposite directions of rotation, and they each have a plurality of barbs formed thereon which project outwardly from opposite side edges thereof. The prongs are adapted to be embedded into a wooden picture frame for permanently securing the hanger thereto, so that a pair of the hangers can be effectively utilized in combination with a picture-frame wire for supporting a picture frame on a wall.

10 Claims, 1 Drawing Sheet

SELF-FASTENING HANGER

BACKGROUND OF THE INVENTION

The instant invention relates to picture frames, and more particularly to a picture frame hanger of the type used to attach a picture-frame wire to the rear of a wooden picture frame.

Various methods of hanging picture frames are known in the art. One method which is particularly well known is to attach a picture wire to a frame so that it extends across the back thereof and to then suspend the frame on a wall by means of the picture wire. Many types of hangers have been heretofore available for attaching picture wires to picture frames. However, most of the heretofore available hangers have required the use of separate fasteners, such as screws or nails. Although these hangers have proven to be generally effective, it has been found that there nevertheless is a need for a hanger which is more easily attachable to a picture frame, such as a hanger which does not utilize external fasteners.

SUMMARY OF THE INVENTION

The instant invention provides a self-fastening hanger for attaching a picture-frame wire to a wooden picture frame. Briefly, the hanger comprises a planar metallic body portion, an integral ring portion which extends outwardly from one end of the body portion, and a pair of integral prongs which project outwardly in spaced relation from the body portion. The prongs are formed in a spiral configuration so that they spiral in opposite directions of rotation, and they further each include a plurality of barbs which extend outwardly from opposite sides thereof. The prongs are adapted to be embedded into a wooden frame in order to permanently secure them thereto. Further, it has been found that the oppositely spiraling configuration of the prongs enables the prongs to be more effectively permanently embedded in the wood of a picture frame.

In use, a pair of the self-attaching hangers are mounted on opposite side portions of the back of a picture frame, and a picture wire is stretched between the hangers and attached to the ring portions thereof. The picture frame can then be suspended on a wall by means of the picture wire. In this regard, it has been found that the self-attaching hanger of the subject invention has sufficient holding strength so that two of the hangers are adequate to support most picture frames. However, the hanger nevertheless has an aperture formed in the center of the body portion thereof for receiving an additional fastener, such as a screw or nail, in order to even more securely attach the hanger to a frame.

Therefore, it is an object of the instant invention to provide a self-fastening hanger for a picture frame.

It is another object of the invention to provide an effective hanger for attaching a picture wire to a wooden picture frame.

It is yet another object of the invention to provide a self-fastening hanger which includes self-securing, barbed prongs which are adapted to be spirally embedded into a wooden picture frame.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
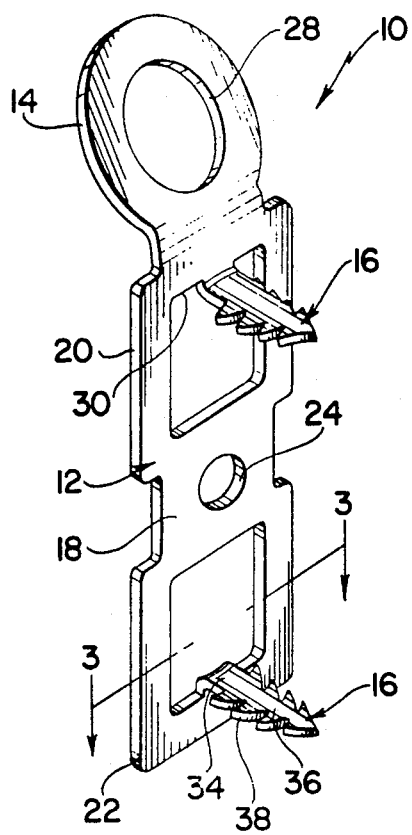
FIG. 1 is a perspective view of the self-fastening hanger of the instant invention.

Referring now to the drawing, the self-fastening hanger of the instant invention is illustrated and generally indicated at 10 in FIG. 1. The hanger 10 is preferably integrally struck from a suitable metal, such as carbon steel, and it comprises a main body portion 12, a ring portion 14 which extends outwardly from one end of the main body portion 12, and a pair of prongs 16 which project outwardly from the body portion 12. The prongs 16 are adapted to be embedded into a wooden picture frame for permanently securing the hanger 10 thereto, and the ring portion 14 is adapted for attaching a picture wire thereto. In use, a pair of the hangers 10 are embedded into opposite side portions of the back of a picture frame, and a picture wire is stretched between the hangers 10. The frame can then be suspended on a wall by means of the picture wire and the hanger 10.

The main body portion 12 is of substantially planar elongated configuration, and it includes a central portion 18 and a pair of rectangular open frame sections 20 and 22 on opposite ends of the central portion 18. An aperture 24 is provided in the center of the central portion 18.

The ring portion 14 is preferably of substantially circular ring-like configuration, and it is preferably oriented so that it extends angularly outwardly from the plane of the main body portion 12 on the opposite side thereof from the prongs 16. It has been found that this orientation of the ring portion 14 makes it easier for a user to attach a picture wire to the hanger 10 once the prongs 16 have been embedded in a wooden picture frame. The ring portion 14 includes an inner edge 28 which is preferably rolled so as not to cut a picture wire which is attached thereto.

The prongs 16 are integrally formed with the hanger 10, and they project outwardly in spaced relation from one side or face of the main body portion 12 along inner edges 30, 32 of the open frame sections 20 and 22. The hanger 10 is initially formed so that the prongs 16 are disposed in substantially co-planar relation with the body portion 12, and so that they extend inwardly from the inner edges 30 and 32 of the frame sections 20 and 22 toward the central portion 18. Thereafter, the prongs 16 are bent downwardly so that they project outwardly from the plane of hanger 10. It is pointed out that the prongs 16, the center aperture 24, and the ring portion 14 are preferably substantially aligned along a common longitudinal centerline 33 of the hanger 10.

Figure 2:
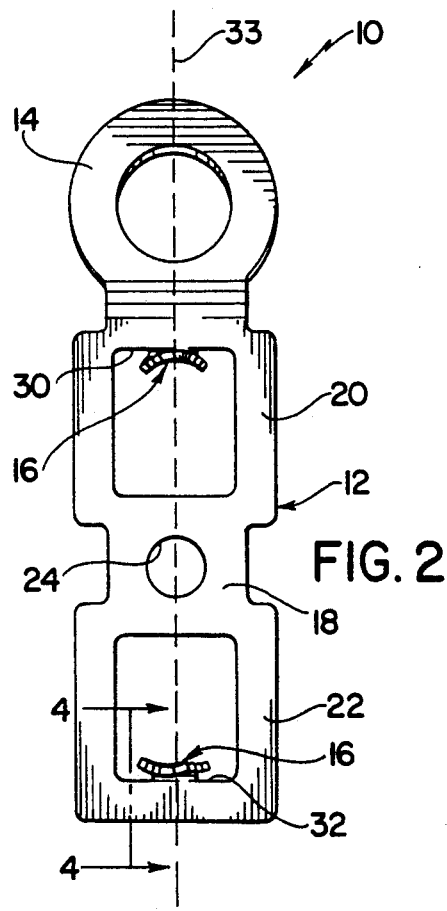
FIG. 2 is a bottom plan view.
Figure 3:
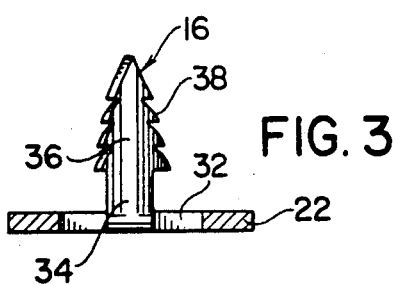
FIG. 3 is a sectional view taken along the line 3—3 in FIG. 1.
Figure 4:
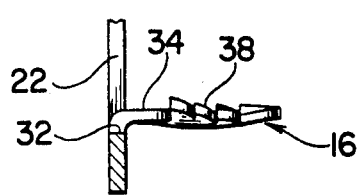
FIG. 4 is a side view of one of the spiraled prongs.

The prongs 16 each comprise a trunk or base section 34 and a "Christmas-tree" shaped portion 36 comprising a plurality of barbs 28 which extend outwardly from opposite side edges of the portion 36. The prongs 16 are formed in a slightly spiraled configuration so that they spiral in opposite directions of rotation. The rotation of the prongs 16 is most clearly seen in FIG. 2. The spiraled prongs 16 are adapted to be embedded into a wooden picture frame (not shown) so that they are permanently secured therein. In this regard, the spiral configuration of the prongs 16, wherein the prongs spiral in opposite directions of rotation, enables the prongs 16 to be more effectively embedded into the wood of a frame so that they are securely held therein. Further, the barbs 38 function to even more securely retain the prongs 16 in embedded relation in the wood of a picture frame. It has been found that once the prongs 16 of a pair of the hangers 10 have been secured to a picture frame in this manner, the hangers 10 are normally able to support a picture frame weighing up to 75 pounds. Thus, it is seen that the hanger 10 is effective for hanging almost any type or size of frame. In addition, screws or nails can be applied to a frame through the apertures 24 in the main body portions 18 of the hangers 10 if a user wants the security of additional holding strength, or if it is desired to utilize a pair of the hangers 10 with an excessively heavy picture frame.

The hanger 10 is preferably heat treated to provide extra strength thereto so that the prongs 16 can be effectively embedded into a frame made of a hard wood, such as oak or maple. Further, it will be understood that the hanger 10 of the instant invention can also be utilized for other applications, such as for hanging wooden decorative articles or other articles having wooden frames or backs.

It is seen therefore that the instant invention provides a simple and effective hanger for attaching a picture-frame wire to a wooden picture frame. The prongs 16 of the hanger 10 are especially adapted to be effectively embedded into a wooden picture frame, so that the hanger 10 is permanently secured thereto. The hanger 10 can be effectively utilized without additional fasteners, such as screws or nails, and a pair of the hangers 10 are normally capable of supporting a frame weighing up to 75 pounds. For these reasons, it is believed that the self-fastening hanger of the instant invention represents significant advancements in the picture frame hanging art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A self-fastening hanger comprising:
   a substantially planar metallic body portion;
   a ring portion on said body portion for securing a wire to said hanger; and
   at least one prong projecting outwardly from said body portion for securing said hanger to a wooden article, said prong being formed in a slightly spiral configuration.

2. In the self-fastening ring hanger as claimed in claim 1, said hanger being integrally struck from a hardened steel.

3. In the self-fastening ring hanger as claimed in claim 1, said ring portion having a rolled inner edge so as not to cut said wire.

4. In the self-fastening ring hanger as claimed in claim 1, said body portion having a centrally located aperture therein for receiving a fastening element therethrough.

5. In the self-fastening ring hanger as claimed in claim 4, said body portion including a longitudinal centerline, said ring portion, said prongs, and said central aperture being substantially aligned along said centerline.

6. In the self-fastening ring hanger as claimed in claim 1, said ring portion extending outwardly at an angle to the plane of said body portion in a direction opposite from said prong.

7. The self-fastening hanger of claim 1 further comprising a pair of said prongs projecting outwardly in spaced relation from said body portion.

8. In the self-fastening hanger of claim 1, said prong having a plurality of barbs formed thereon.

9. In the self-fastening hanger of claim 7, said prongs each having a plurality of barbs formed thereon.

10. In the self-fastening hanger of claim 7, said prongs spiraling in opposite directions.

* * * * *